United States Patent
Xu et al.

(10) Patent No.: US 11,877,341 B2
(45) Date of Patent: Jan. 16, 2024

(54) METHOD AND APPARATUS FOR ACCESS CONTROL IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 17/423,093

(22) PCT Filed: Jan. 20, 2020

(86) PCT No.: PCT/KR2020/000952
§ 371 (c)(1),
(2) Date: Jul. 14, 2021

(87) PCT Pub. No.: WO2020/149718
PCT Pub. Date: Jul. 23, 2020

(65) Prior Publication Data
US 2022/0132626 A1   Apr. 28, 2022

(30) Foreign Application Priority Data

Jan. 18, 2019   (KR) ........................ 10-2019-0007102

(51) Int. Cl.
*H04W 76/40* (2018.01)
*H04W 76/11* (2018.01)
(Continued)

(52) U.S. Cl.
CPC ............. *H04W 76/40* (2018.02); *H04W 4/50* (2018.02); *H04W 48/02* (2013.01); *H04W 76/11* (2018.02); *H04W 88/085* (2013.01); *H04W 92/20* (2013.01)

(58) Field of Classification Search
CPC ......... H04W 4/08; H04W 4/50; H04W 72/04; H04W 72/21; H04W 76/11; H04W 76/40; H04W 88/10
(Continued)

(56) References Cited

U.S. PATENT DOCUMENTS

| 2018/0084391 A1 | 3/2018 | Li et al. |
| 2018/0376380 A1 | 12/2018 | Leroux |
| 2019/0380128 A1* | 12/2019 | Park ...................... H04W 88/10 |

FOREIGN PATENT DOCUMENTS

WO   WO-2019137406 A1 *   7/2019

OTHER PUBLICATIONS

Machine translation of WO2019137406 (Year: 2019).*
(Continued)

*Primary Examiner* — Harun Chowdhury
(74) *Attorney, Agent, or Firm* — BRYAN CAVE LEIGHTON PAISNER LLP

(57) ABSTRACT

The present disclosure relates to an access control in a wireless communications. According to an embodiment of the present disclosure, a method performed by a central unit (CU) of a base station in a wireless communication system comprises: receiving, from a distributed unit (DU) of the base station, a list of closed access group (CAG) identifiers (IDs) supported by the DU; and controlling a communication between the DU and a wireless device based on a match between at least one CAG ID in the list of CAG IDs supported by the DU and at least one CAG ID in a list of CAG IDs supported by the wireless device.

17 Claims, 17 Drawing Sheets

(51) Int. Cl.
*H04W 4/50* (2018.01)
*H04W 48/02* (2009.01)
*H04W 88/08* (2009.01)
*H04W 92/20* (2009.01)

(58) Field of Classification Search
USPC ..................................... 370/252, 329, 331
See application file for complete search history.

(56) References Cited

OTHER PUBLICATIONS

"3GPP; TSG SA; Study on 5GS Enhanced support of Vertical and LAN Services (Release 16)", 3GPP TR 23.734 V1.0.0, Dec. 7, 2018, pp. 16, 19.
"LTE; Evolved Universal Terrestrial Radio Access (E-UTRA); User Equipment (UE) procedures in idle mode (3GPP TS 36.304 version 15.1.0 Release 15)", ETSI TS 136 304 V15.1.0, Oct. 17, 2018, pp. 11-16, 33.
"5G; NG-RAN; Architecture description (3GPP TS 38.401 version 15.3.0 Release 15)", ETSI TS 138 401 V15.3.0, Sep. 28, 2018, pp. 11, 13, 15, 17, 22-24, 27-28.
"3rd Generation Partnership Project; Technical Specification Group Radio Access Network; NG-RAN; Architecture description (Release 15)" Section 6 and Sections 8.1 and 8.6 of 3GPP TS 38.401 V15.4.0, (Dec. 2018).
"3rd Generation Partnership Project; Technical Specification Group Radio Access Network; NG-RAN; F1 general aspects and principles (Release 15)", Sections 5.2 and 7.1 of 3GPP TS 38.470 V15.4.0, (Dec. 2018).

\* cited by examiner

METHOD AND APPARATUS FOR ACCESS CONTROL IN WIRELESS COMMUNICATION SYSTEM

This application is the National Stage filing under 35 U.S.C. 371 of International Application No. PCT/KR2020/000952, filed on Jan. 20, 2020, which claims the benefit of Korean Patent Application No. 10-2019-0007102, filed on Jan. 18, 2019, the contents of which are all hereby incorporated by reference herein in their entirety.

BACKGROUND OF THE DISCLOSURE

Field of the Disclosure

The present disclosure relates to an access control in a wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, there might be a case in which a service should be limited to specific area and/or specific user equipments (UEs). For example, for advanced services like industry digitalization and/or services in smart factories, such services need to be closed and/or limited in a specific area (e.g., in a factory). For another example, operators may provide a specific service layer for high-value customers to give them a higher-quality differentiated services. The limited service may comprise, for example, a service for an indoor hotspot deployment scenario, which focuses on small coverage and high user throughput or user density in buildings.

SUMMARY OF THE DISCLOSURE

Technical Problem

An aspect of the present disclosure is to provide method and apparatus for access control in wireless communication system.

Another aspect of the present disclosure is to provide method and apparatus for mobility management in a wireless communication system.

Another aspect of the present disclosure is to provide method and apparatus for access control in a central unit (CU)/distributed unit (DU) based architecture.

Another aspect of the present disclosure is to provide method and apparatus for controlling a communication between DU and UE in a wireless communication system.

Another aspect of the present disclosure is to provide method and apparatus for resource allocation to the UE in a wireless communication system.

Technical Solution

According to an embodiment of the present disclosure, a method performed by a central unit (CU) of a base station in a wireless communication system comprises: receiving, from a distributed unit (DU) of the base station, a list of closed access group (CAG) identifiers (IDs) supported by the DU; and controlling a communication between the DU and a wireless device based on a match between at least one CAG ID in the list of CAG IDs supported by the DU and at least one CAG ID in a list of CAG IDs supported by the wireless device.

According to an embodiment of the present disclosure, a method performed by a distributed unit (DU) of a base station in a wireless communication system comprises: receiving, from a central unit (CU) of the base station, a list of CAG IDs supported by a wireless device; and performing a resource allocation to the wireless device based on a match between at least one CAG ID in the list of CAG IDs supported by the wireless device and at least one CAG ID in a list of CAG IDs supported by the DU.

According to an embodiment of the present disclosure, a central unit (CU) of a base station in a wireless communication system comprises: a memory; a communication interface; and at least one processor operatively coupled to the memory and the communication interface, configured to: control the communication interface to receive, from a distributed unit (DU) of the base station, a list of closed access group (CAG) identifiers (IDs) supported by the DU, and control a communication between the DU and a wireless device based on a match between at least one CAG ID in the list of CAG IDs supported by the DU and at least one CAG ID in a list of CAG IDs supported by the wireless device.

According to an embodiment of the present disclosure, a distributed unit (DU) of a base station in a wireless communication system comprises: a memory; a communication interface; and at least one processor operatively coupled to the memory and the communication interface, configured to: control the communication interface to receive, from a central unit (CU) of the base station, a list of CAG IDs supported by a wireless device, and perform a resource allocation to the wireless device based on a match between at least one CAG ID in the list of CAG IDs supported by the wireless device and at least one CAG ID in a list of CAG IDs supported by the DU.

Advantageous Effect

The present disclosure can have various advantageous effects.

For example, by performing an access control, mobility management and/or resource allocation based on closed access group (CAG) identities (IDs), advanced services can be realized in a wireless communication system (e.g., 5G NR), and/or in CU/DU based architecture.

For advanced services like industry digitalization and smart factories, the service can be closed in factory. Or operators can provide a specific service layer for high-value customers to give them the higher-quality differentiated services. Or the service can be for the indoor hotspot deployment scenario, which focuses on small coverage and high user throughput or user density in buildings. Various embodiments provide solutions to make the services be realistic in case of CU/DU split based NG-RAN architecture.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
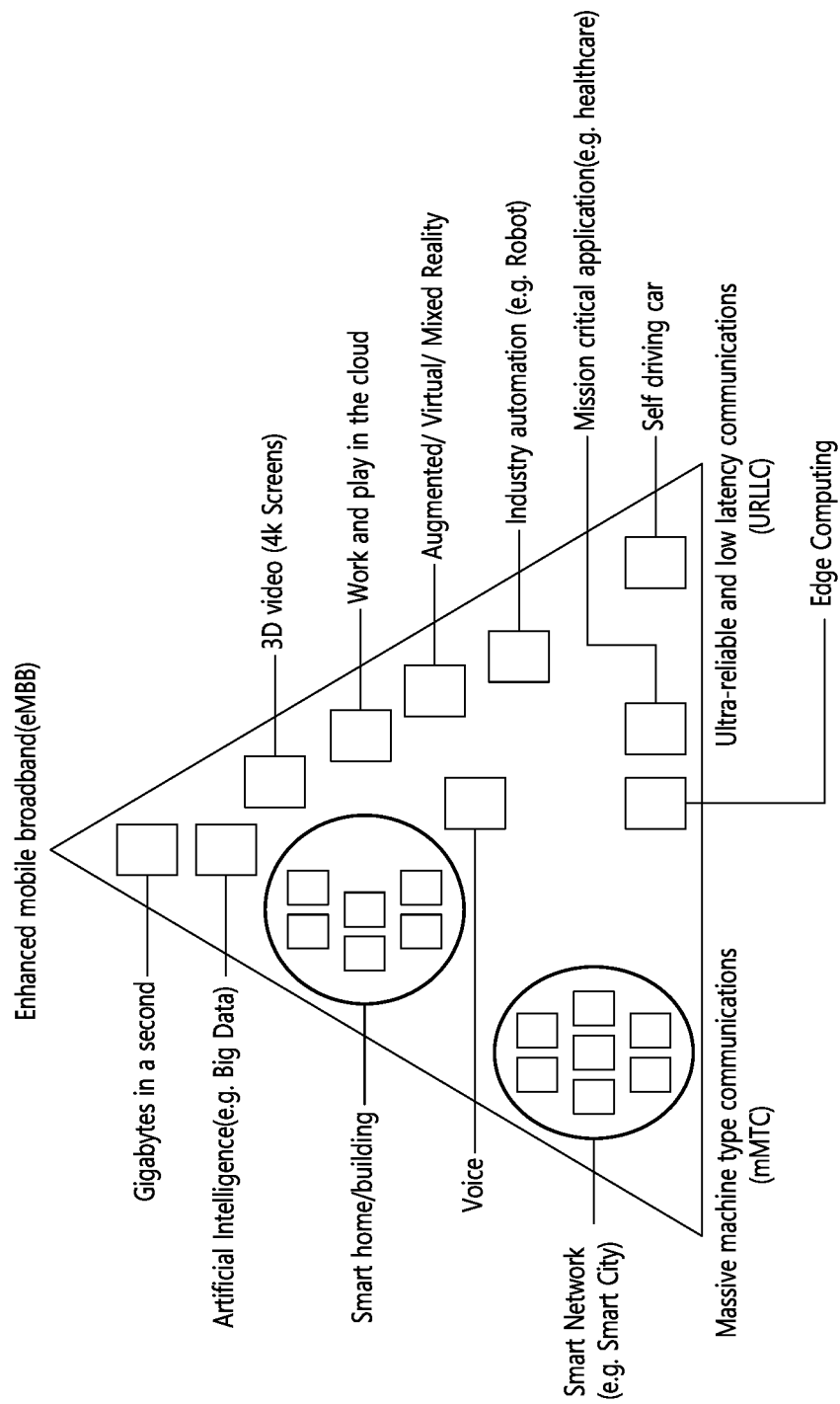
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-1-DMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the present disclosure may be defined as follows:

"closed access group (CAG)" refers to a group of RAN nodes (e.g., eNB, gNB, gNB-CU, gNB-DU, gNB-CU-CP, gNB-CU-UP, base station and/or cell) in a PLMN which allows access to specific UEs.

"CAG identity/identifier (ID)" refers to an ID which identifies a CAG in PLMN.

"CAG ID supported by UE" refers to an ID of a CAG in a PLMN which allows access to the UE. The CAG ID supported by UE may be simply referred to as a CAG ID of the UE. A UE can supported one or more CAG IDs. The CAG ID of the UE may be included in subscription information of the UE.

"CAG ID supported by a RAN node (e.g., eNB, gNB, gNB-CU, gNB-DU, gNB-CU-CP, gNB-CU-UP, base station and/or cell)" refers to an ID of CAG in a PLMN to which the RAN node belongs. The CAG ID supported by the RAN node may be simply referred to as a CAG ID of the RAN node. A RAN node can support one or more CAG IDs.

"Access mode" of a RAN node refers to a mode indicating whether to allow access to all UEs, allow access only to UEs supporting CAG ID of the RAN node, or allow access to all UEs but give a priority of using resources to UEs supporting CAG ID of the RAN node. A mode indicating to allow access to all UEs may be referred to as "open (access) mode". A mode indicating to allow access only to UEs supporting CAG ID of a RAN node may be referred to as "closed (access) mode". A mode indicating to allow access to all UEs but give a priority of using resources to UEs supporting CAG ID of the RAN node may be referred to as "hybrid (access) mode".

"Membership status" of a UE for a CAG refers to whether the UE is a member of the CAG (i.e., the CAG allows access to the UE) or is not a member of the CAG (i.e., the CAG does not allow access to the UE).

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and 1-R2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
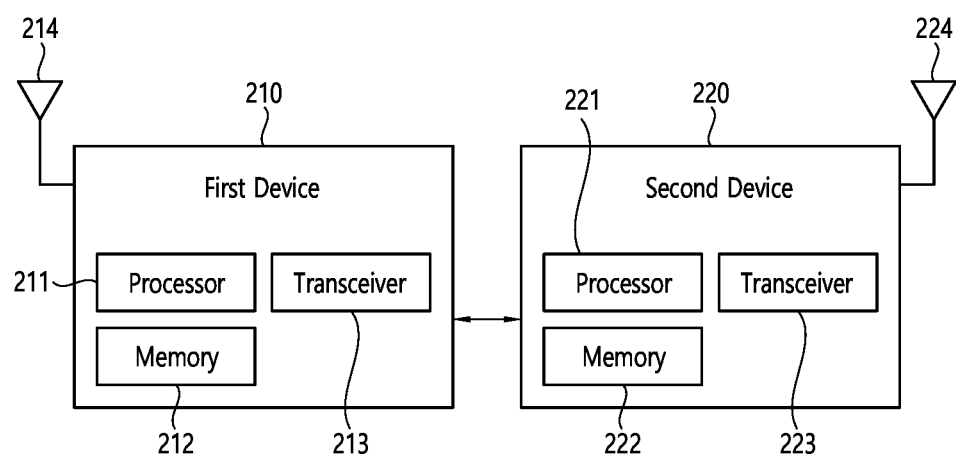
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

According to various embodiments, some components of the first device 210 and/or the second device 220 may be omitted, and the first device 210 and/or the second device 220 may comprise one or more other components although not illustrated in FIG. 2. For example, if the first device 210 (or the second device 220) is a core network node or a RAN node, the first device 210 (or the second device 220) may comprise a communication interface which is connected to the processor 211 (or processor 221) and may be controlled to transmit and receive signals through wires (e.g., backhaul).

According to various embodiments, the processor 211 (or the processor 221) may be configured to, or configured to control the transceiver (e.g., transceiver 213 and/or transceiver 223) and/or the communication interface to implement a method performed by the RAN node, which will be further described below.

Figure 3:
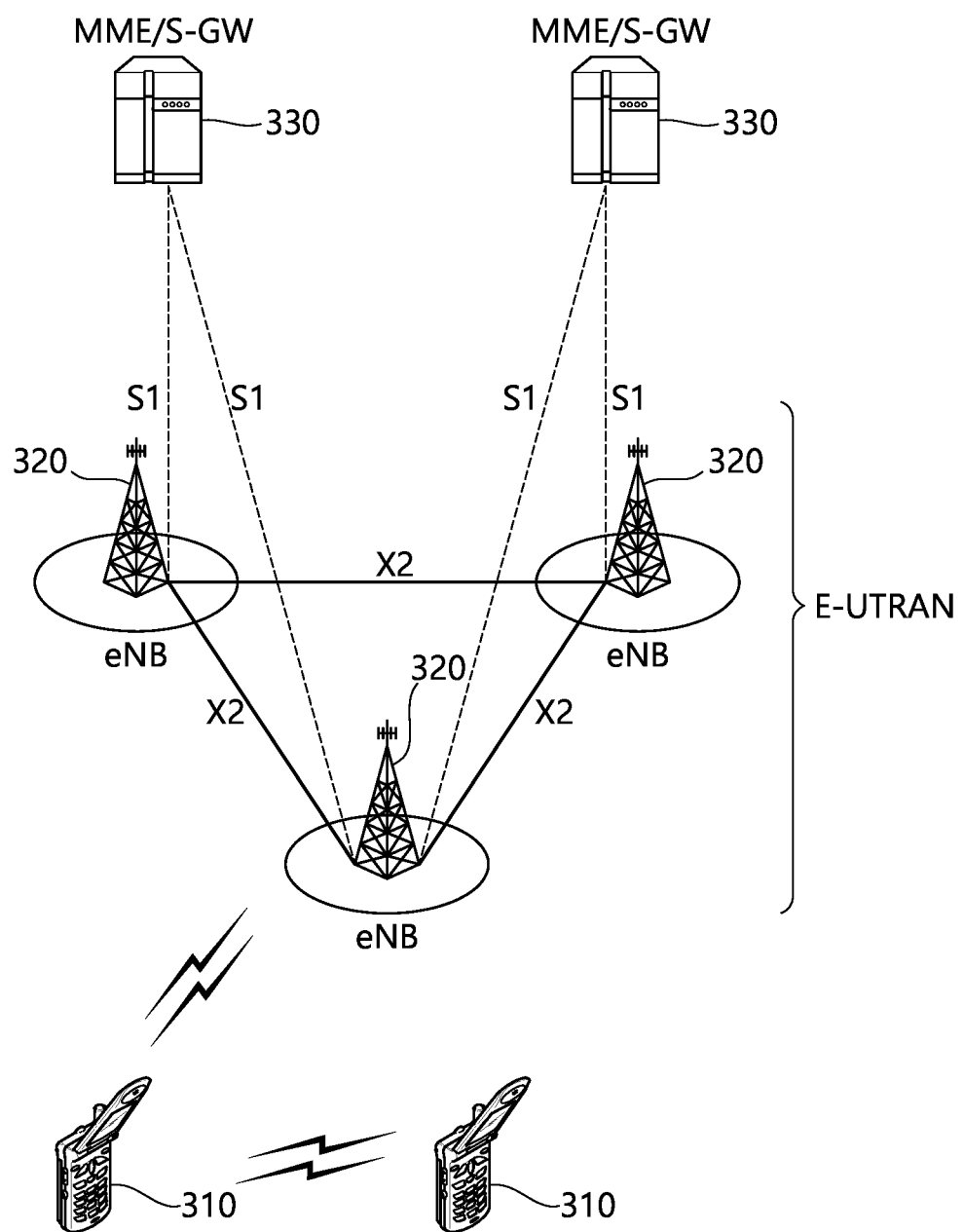
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
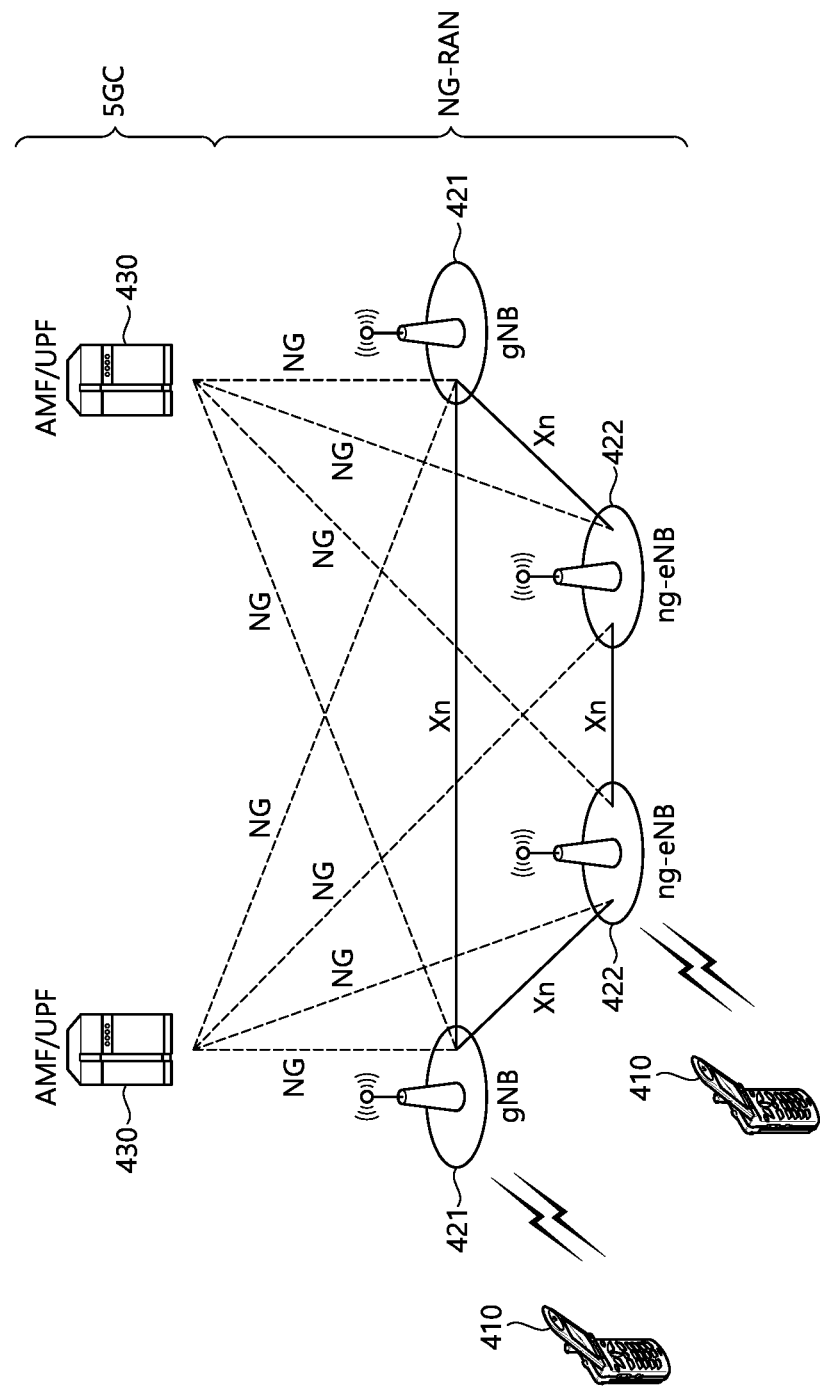
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW.

The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
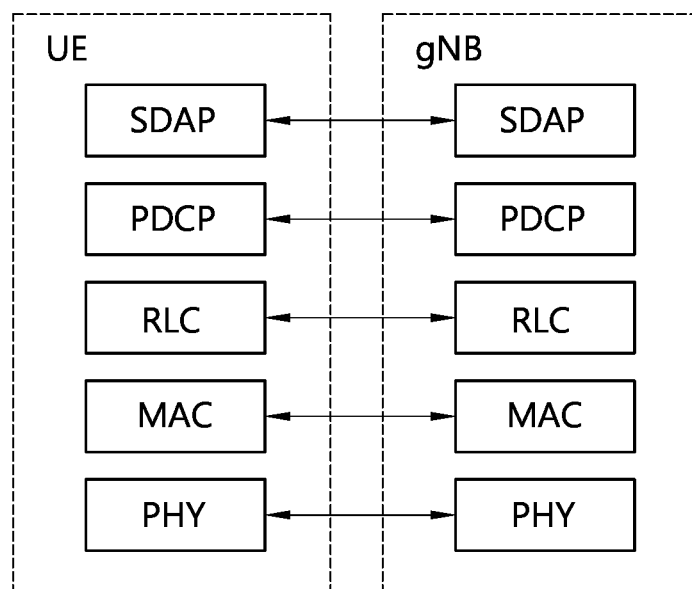
FIG. 5 shows a block diagram of a user plane protocol stack to which the technical features of the present disclosure can be applied.
Figure 6:
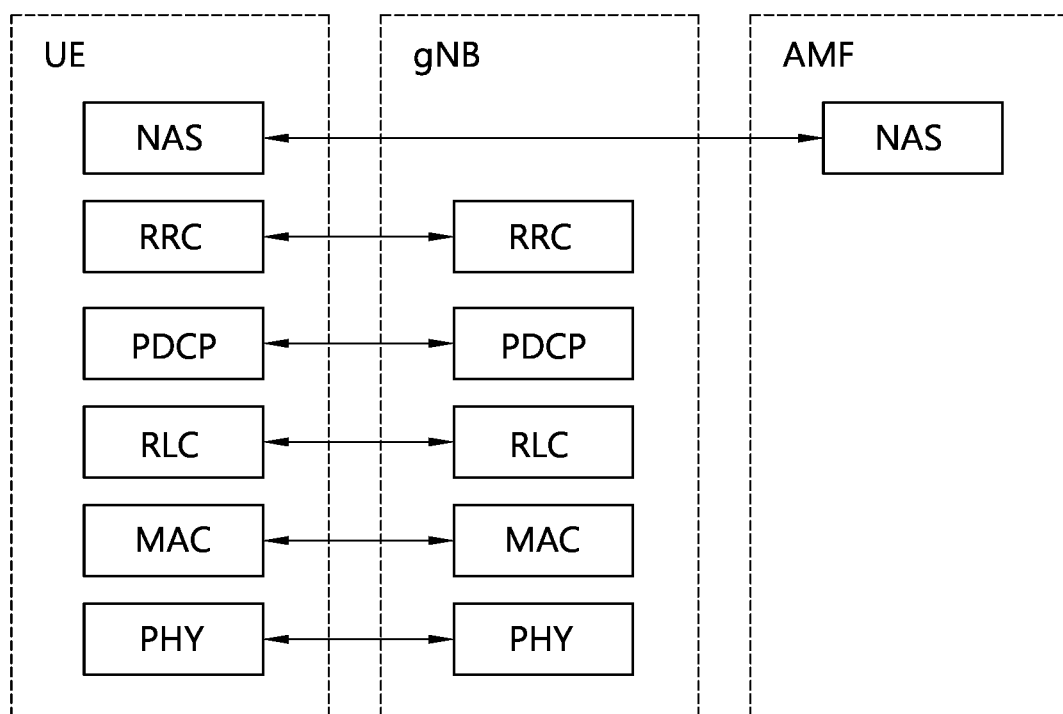
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Split of gNB central unit (gNB-CU) and gNB distributed unit (gNB-DU) is described. Section 6 of 3GPP TS 38.401 V15.4.0 (2018 December) and Sections 5.2 and 7.1 of 3GPP TS 38.470 V15.4.0 (2018 December) may be referred.

Figure 7:
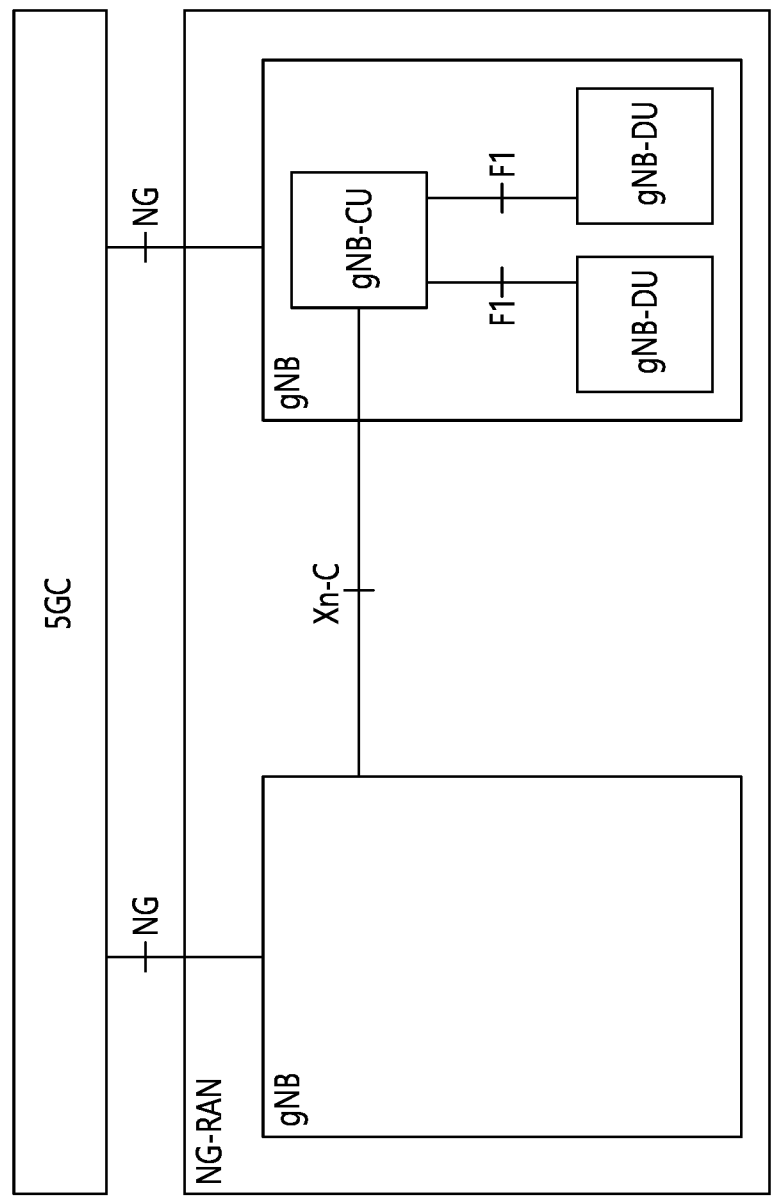
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

Figure 8:
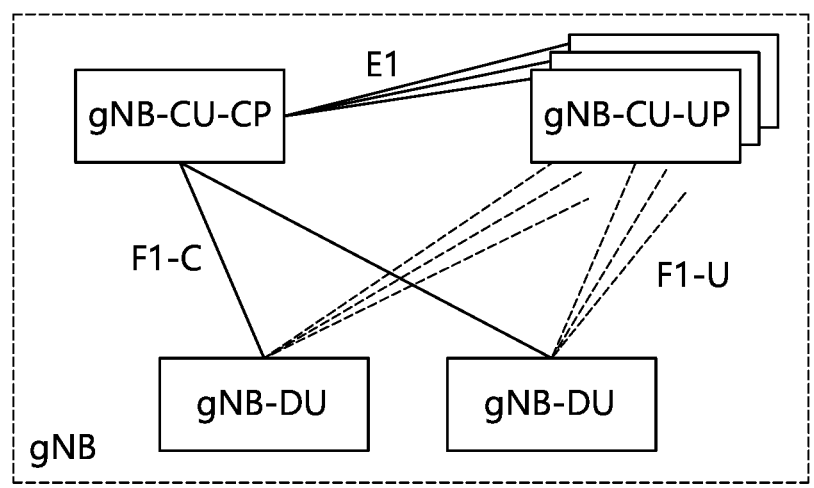
FIG. 8 shows an example of overall architecture for separation of gNB-CU-control plane (gNB-CU-CP) and gNB-CU-user plane (gNB-CU-UP) to which technical features of the present disclosure can be applied.

FIG. 8 shows an example of overall architecture for separation of gNB-CU-control plane (gNB-CU-CP) and gNB-CU-user plane (gNB-CU-UP) to which technical features of the present disclosure can be applied.

Referring to FIG. 8, a gNB may include a gNB-CU-CP, multiple gNB-CU-UPs and multiple gNB-DUs. A gNB-CU-CP may be simply referred to as CU-CP and a gNB-CU-UP may be simply referred to as CU-UP. The gNB-CU-CP and the gNB-CU-UP may be included in gNB-CU.

The gNB-CU-CP may be a logical node hosting an RRC and a control plane part of a PDCP protocol of the gNB-CU for a gNB. As illustrated, the gNB-CU-CP is connected to the gNB-DU through F1-C interface. The gNB-CU-CP terminates an E1 interface connected with the gNB-CU-UP and the F1-C interface connected with the gNB-DU.

The gNB-CU-UP may be a logical node hosting a user plane part of the PDCP protocol of the gNB-CU for a gNB, and the user plane part of the PDCP protocol and a SDAP protocol of the gNB-CU for a gNB. As illustrated, the gNB-CU-UP is connected to the gNB-DU through F1-U interface, and is connected to the gNB-CU-CP through the E1 interface. The gNB-CU-UP terminates the E1 interface connected with the gNB-Cu-CP and the F1-U interface connected with the gNB-DU.

According to an illustration shown in FIG. 8, the following properties may hold:
(1) A gNB-DU may be connected to a gNB-CU-CP.
(2) A gNB-CU-UP may be connected to a gNB-CU-CP.
(3) A gNB-DU can be connected to multiple gNB-CU-UPs under the control of the same gNB-CU-CP (i.e., the gNB-CU-CP to which the gNB-DU is connected and the multiple gNB-CU-UPs are connected).
(4) A gNB-CU-UP can be connected to multiple DUs under the control of the same gNB-CU-CP (i.e., the gNB-CU-CP to which the gNB-CU-UP is connected and the multiple DUs are connected).

In a wireless communication system, there might be an issue regarding network discovery, selection and/or access control for non-public networks (for example, one of the key issues of 3GPP TR23.734 v1.0.0 (2018 December): Study on 5GS Enhanced support of Vertical and LAN Services). The issue may aim at studying network discovery, selection and access control for non-public networks. Solutions to this key issue are expected to address the following aspects:
Non-public network subscriptions
How is information identifying a non-public network provided to the UE for network discovery and selection?
Which criteria are used by the UE for automatic selection of non-public networks
How to support manual selection of non-public networks
How to prevent UEs not authorized for a given non-public network from attempting to automatically select and register in that non-public network?
How to enable the network to verify whether a UE is authorized to access a non-public network?
Which network entities perform access control for non-public networks?
Access barring aspects for non-public networks
Where access restrictions are configured (e.g. subscription or configuration)?
How to enable UEs to access non-public networks but prevent the same UEs from accessing public PLMNs?
How to prevent UEs not supporting non-public networks from attempting to access type-a and type-b networks?
How to prevent NG-RAN from handing over a UE to a non-public network if the UE is not permitted to access the non-public network?

The solution addressing the issue may support, but not limited to, non-stand-alone non-public networks (i.e. non-public networks that are deployed as part of a PLMN). The non-stand-alone non-public networks may refer to and/or include CAG.

Also, the solution may be based on the following principles:
(1) Identities
CAG ID uniquely identifies a closed access group (CAG) in a PLMN.
A human-readable network name identifies the CAG. The human-readable name may be unique.
(2) The following information is broadcasted in SIB for a PLMN that supports a CAG:
CAG indication identifying the cell as a Closed Access Group cell.
cellReservedForOtherUse indication (to prevent non-supporting UEs from accessing the cell). UEs that support non-public networks consider a cell that broadcasts both the cellReservedForOtherUse and the CAG indication as not barred.
CAG ID.
(Optional) Human-readable network name.
(3) Network and cell selection
UE maintains a white list of CAG IDs
UE configured to only access CAG cells are not allowed to register via non-CAG cells of any PLMN.
UE shall only automatically select and attempt to register via a CAG cell whose identity is contained in the white list.
For manual CAG selection the UE presents the list of available CAG IDs and related human-readable names (if available). If a UE has successfully registered to a CAG which was not listed in the white list yet, the CAG ID is added to the CAG white list.
(4) Subscription
Subscription contains the list of CAGs the UE is entitled to access
Subscription contains indication whether the UE is only allowed to access CAG cells (UE is also configured accordingly); this is to address factory devices that are supposed to remain on the CAG cells In a wireless communication system (e.g., 5G NR), CU-DU or CU-CP/CU-UP split architectures may be adopted. In addition, some advanced services are also to be designed for vertical areas. The UE access problem can happen in case a cell/DU/CU-CP/CU-UP has an access limitation for UEs (e.g., depending on UE's subscription information).

For example, some advances services may be limited to, or provided based on a closed mode to specific UEs only. Or, the service may be provided based on a hybrid mode (i.e., all UEs may access and be provided with services, but if a specific UE (e.g., UE supporting CAG ID of a RAN node which provides the services) joined the services, the specific UE may have a priority to use resources). The UE access problem can happen in case a cell/DU/CU-CP/CU-UP has an access limitation for UEs (e.g., depending on UE's subscription information).

Therefore, various embodiments are provided in the present disclosure to address the UE access problem.

Figure 9:
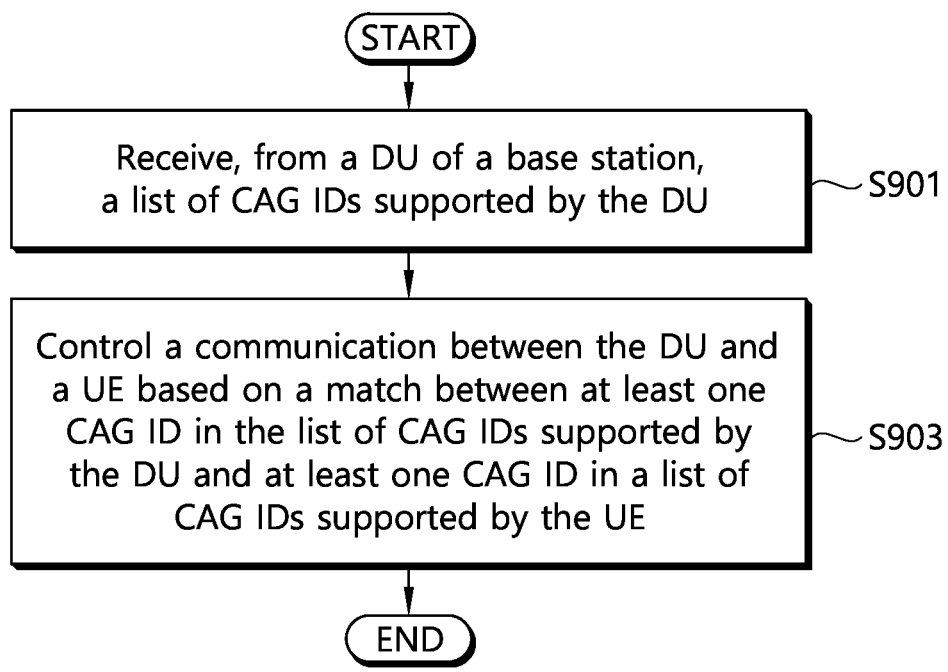
FIG. 9 shows an example of a method for access control performed by a CU according to an embodiment of the present disclosure.

FIG. 9 shows an example of a method for access control performed by a CU according to an embodiment of the present disclosure. The method may be performed by a CU of a base station.

Referring to FIG. 9, in step S901, the CU may receive, from a DU of the base station, a list of CAG IDs supported by the DU. The list of CAG IDs supported by the DU may comprise one or more CAG IDs supported by the DU. The CU, DU and/or base station may be in a closed mode.

In step S903, the CU may control a communication between the DU and a UE based on a match between at least one CAG ID in the list of CAG IDs supported by the DU and at least one CAG ID in a list of CAG IDs supported by the UE. The list of CAG IDs supported by the UE may comprise one or more CAG IDs supported by the UE. For example, if at least one CAG ID in the list of CAG IDs supported by the DU matches at least one CAG ID in the list of CAG IDs supported by the UE, the CU may control to perform a communication between the DU and the UE. For another example, though not illustrated in FIG. 9, if there is no match of CAG ID between the list of CAG IDs supported by the DU and the list of CAG IDs supported by the UE, the CU may control not to perform a communication between the DU and the UE. Alternatively or additionally, at least one of the CU, DU or the base station may reject access for the UE.

According to various embodiments, the CU may receive, from the DU, an F1 setup request message comprising the list of CAG IDs supported by the DU. The F1 setup request message may be a message for requesting a setup of an F1 interface between the CU and the DU.

According to various embodiments, the CU may transmit, to the DU, an F1 setup response message comprising a list of CAG IDs supported by the CU. The F1 setup response message may be a response message for the F1 setup request message.

According to various embodiments, The F1 setup request message and the F1 setup response message may be exchanged between the CU and the DU in a procedure of setting up an application level configuration data to inter-operate over the F1 interface.

According to various embodiments, the CU may obtain the list of CAG IDs supported by the UE from a core network entity. For example, the CU may receive, from an access and mobility management function (AMF) entity, an initial context setup request message comprising the list of CAG IDs supported by the UE.

According to various embodiments, the CU may receive, from a plurality of DUs of the base station (which are connected to the CU via F1 interface or F1-C interface), a list of CAG IDs supported by each of the plurality of DUs. Further, the CU may identify at least one CAG ID in the list of CAG IDs supported by each of the plurality of DUs that matches the at least one CAG in the list of CAG IDs supported by the UE. Then, the CU may select one or more DUs among the plurality of DUs which support the at least one identified CAG ID, and select the DU to communicate with the UE among the one or more DUs.

According to various embodiments, The CU may control to perform a communication between the DU and the UE during, for example, a mobility management (MM) attach procedure, service request procedure, tracking area update (TAU) procedure, handover mobility procedure, DU change procedure, and/or dual connectivity (DC) procedure.

According to various embodiments, the CU may comprise CU-CP and one or more CU-UPs. In this case, the CU (or, the CU-CP) may receive, from one or more CU-UPs, a list of CAG IDs supported by each of the one or more CU-UPs, and select at least one of the DU or a CU-UP among the one or more CU-UPs based on the list of CAG IDs supported by each of the one or more CU-UPs. For example, the CU (or, the CU-CP) may select a CU-UP among the one or more CU-UPs which supports at least one CAG ID matching the at least one CAG ID in the list of CAG IDs supported by the UE.

According to various embodiments, the list of CAG IDs supported by each of the one or more CU-UPs may be received by the CU (or, the CU-CP) from the one or more CU-UPs in a procedure of setting up an E1 interface between the CU-CP and each of the one or more CU-UPs.

According to various embodiments, the CU (or, the CU-UP) may receive, from a CU-CP, a bearer context setup request message comprising the list of CAG IDs supported by the UE, and allocate UP resources to the UE based on a match between at least one CAG ID in the list of CAG IDs supported by the UE and at least one CAG ID in a list of CAG IDs supported by the CU (or, the CU-UP).

Figure 10:
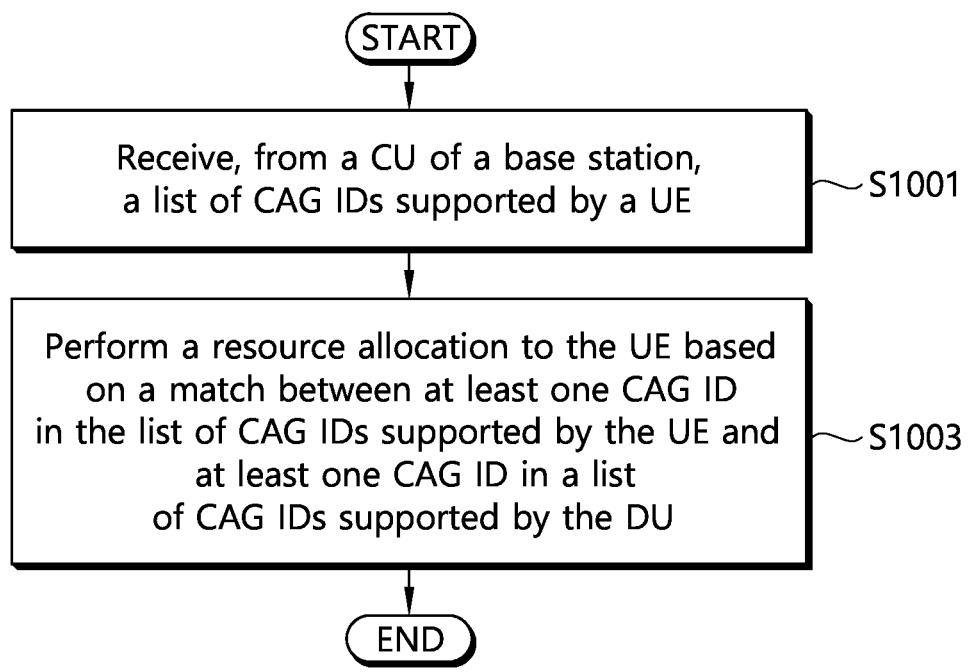
FIG. 10 shows an example of a method for access control by a DU according to an embodiment of the present disclosure.

FIG. 10 shows an example of a method for access control by a DU according to an embodiment of the present disclosure. The method may be performed by a DU of a base station.

Referring to FIG. 10, in step S1001, the DU may receive, from a CU of the base station, a list of CAG IDs supported by a UE. The list of CAG IDs supported by the UE may comprise one or more CAG IDs supported by the UE. The CU, DU, and/or base station may be in a closed mode.

In step S1003, the DU may perform a resource allocation to the UE based on a match between at least one CAG ID in the list of CAG IDs supported by the UE and at least one CAG ID in a list of CAG IDs supported by the DU. The list of CAG IDs supported by the DU may comprise one or more CAG IDs supported by the DU. For example, if at least one CAG ID in the list of CAG IDs supported by the UE matches at least one CAG ID in the list of CAG IDs supported by the DU, the DU may perform a resource allocation (e.g., UP resource allocation) to the UE. On the other hand, though not illustrated in FIG. 10, if there is no match of CAG ID between the list of CAG IDs supported by the UE and the list of CAG IDs supported by the DU, the DU may not allocate resources to the UE. Alternatively or additionally, at least one of the CU, DU or the base station may reject access for the UE.

According to various embodiments, the DU may receive, from the CU, a UE context setup request message comprising the list of CAG IDs supported by the UE. The UE context setup request message may be a message informing at least one of signalling radio bearer (SRB) IDs or data radio bearer (DRB) IDs to be setup.

According to various embodiments, the DU may transmit, to the CU, a UE context setup response message comprising a configuration (e.g., RLC, MAC, and/or PHY configuration) of SRBs for the SRB IDs or DRBs for the DRB IDs provided by the DU, based on the match between the at least one CAG ID in the list of CAG IDs supported by the UE and the at least one CAG ID in the list of CAG IDs supported by the DU.

According to various embodiments, the DU may transmit, to the CU, an F1 setup request message comprising the list of CAG IDs supported by the DU, and receive, from the CU, an F1 setup response message comprising a list of CAG IDs supported by the CU. The F1 setup request message may be a message for requesting a setup of an F1 interface between the CU and the DU, and the F1 setup response message may be a response message for the F1 setup request message.

Figure 11:
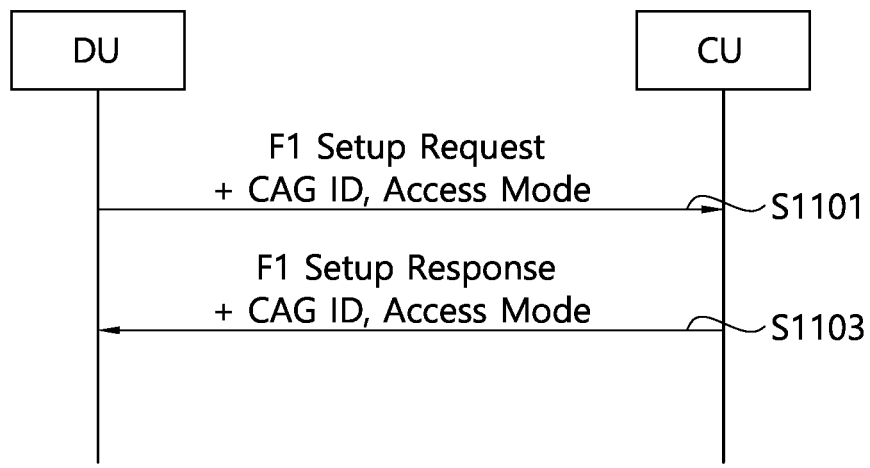
FIG. 11 shows an example of a procedure for F1 interface setup according to an embodiment of the present disclosure.

FIG. 11 shows an example of a procedure for F1 interface setup according to an embodiment of the present disclosure. The procedure may be a cell specific procedure between CU and DU for setting up application level configuration data needed to inter-operate correctly over an F1 interface.

Referring to FIG. 11, in step S1101, a DU may transmit, to a CU, a F1 setup request message. The F1 setup request message may be a message for requesting a setup of an F1 interface between the CU and the DU. The F1 setup request message may comprise at least one of: a CAG ID or similar ID about supporting CAG concept (e.g., a list of CAG IDs or IDs each of which indicates a CAG in a PLMN to which the DU belongs); indication of supporting CAG concept (e.g., indication of CAGs in a PLMN to which the DU belongs); or access mode of the DU indicating whether the DU is in a closed mode, hybrid mode, or open mode.

In step S1103, the CU may transmit, to the DU, a F1 setup response message, which may be a response message for the F1 setup request message. The F1 setup response message may comprise at least one of: a CAG ID or similar ID about supporting CAG concept (e.g., a list of CAG IDs or IDs each of which indicates a CAG in a PLMN to which the CU belongs); indication of supporting CAG concept (e.g., indication of CAGs in a PLMN to which the CU belongs); or access mode of the CU indicating whether the CU is in a closed mode, hybrid mode, or open mode.

After the step S1103, the CU and/or DU can take proper action(s) based on the received parameters in the F1 setup request message or the F1 setup response message. For example, the CU and/or DU can control to perform a communication between the CU/DU and the UE based on a match between the received CAG ID(s) and CAG ID(s) of the UE during, for example, MM attach procedure, service request procedure, TAU procedure, handover mobility procedure, DU change procedure, and/or DC procedure. For another example, the CU and/or DU can select proper DU/cell for the UE based on a match between the received CAG ID(s) and CAG ID(s) of the UE during, for example, MM attach procedure, service request procedure, TAU procedure, handover mobility procedure, DU change procedure, and/or DC procedure.

According to various embodiments, the CU or DU triggered configuration update procedures can transmit a message (e.g., gNB-CU Configuration Update message or gNB-DU Configuration Update message) comprising information to update the status of cells if the CU or DU has changed the information. The information may comprise at least one of: a CAG ID or similar ID about supporting CAG concept (e.g., a list of CAG IDs or IDs each of which indicates a CAG in a PLMN to which the CU or DU belongs); indication of supporting CAG concept (e.g., indication of CAGs in a PLMN to which the CU or DU belongs); or access mode of the CU or DU indicating whether the CU or DU is in a closed mode, hybrid mode, or open mode.

Figure 12:
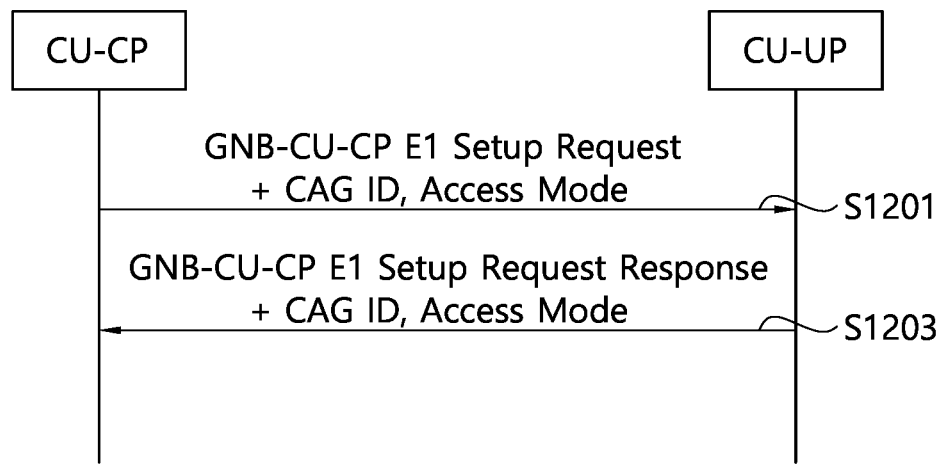
FIG. 12 shows an example of a procedure for E1 interface setup initiated by CU-CP according to an embodiment of the present disclosure.

FIG. 12 shows an example of a procedure for E1 interface setup initiated by CU-CP according to an embodiment of the present disclosure. The procedure may be a cell specific procedure between CU-CP and CU-UP for setting up application level configuration data needed to inter-operate correctly over an E1 interface.

Referring to FIG. 12, in step S1201, the CU-CP may transmit, to the CU-UP, a E1 setup request message (e.g., gNB-CU-CP E1 setup request message), which may be a message for requesting a setup of an E1 interface between the CU-CP and the CU-UP. The E1 setup request message may comprise at least one of: a CAG ID or similar ID about supporting CAG concept (e.g., a list of CAG IDs or IDs each of which indicates a CAG in a PLMN to which the CU-CP belongs); indication of supporting CAG concept (e.g., indication of CAGs in a PLMN to which the CU-CP belongs); or access mode of the CU-CP indicating whether the CU-CP is in a closed mode, hybrid mode, or open mode.

In step S1203, the CU-UP may transmit, to the CU-CP, an E1 setup response message (e.g., gNB-CU-CP E1 setup response message), which may be a response message for the E1 setup request message. The E1 setup response message may comprise at least one of: a CAG ID or similar ID about supporting CAG concept (e.g., a list of CAG IDs or IDs each of which indicates a CAG in a PLMN to which the CU-UP belongs); indication of supporting CAG concept (e.g., indication of CAGs in a PLMN to which the CU-UP belongs); or access mode of the CU-UP indicating whether the CU-UP is in a closed mode, hybrid mode, or open mode.

After the step S1203, the CU-CP and/or CU-UP can take proper action(s) based on the received parameters in the E1 setup request message or the E1 setup response message. For example, the CU-CP and/or CU-UP can control to perform a communication between the CU-CP/CU-UP and the UE based on a match between the received CAG ID(s) and CAG ID(s) of the UE during, for example, MM attach procedure, service request procedure, TAU procedure, handover mobility procedure, DU change procedure, and/or DC procedure. For another example, the CU-CP and/or CU-UP can select proper DU, cell and/or CU-UP for the UE based on a match between the received CAG ID(s) and CAG ID(s) of the UE during, for example, MM attach procedure, service request procedure, TAU procedure, handover mobility procedure, DU change procedure, and/or DC procedure.

According to various embodiments, the CU-CP or CU-UP triggered configuration update procedures can transmit a message (e.g., gNB-CU-CP Configuration Update message or gNB-CU-UP Configuration Update message) comprising information to update the status of cells if the CU-CP or CU-UP has changed the information. The information may comprise at least one of: a CAG ID or similar ID about supporting CAG concept (e.g., a list of CAG IDs or IDs each of which indicates a CAG in a PLMN to which the CU-CP or CU-UP belongs); indication of supporting CAG concept (e.g., indication of CAGs in a PLMN to which the CU-CP or CU-UP belongs); or access mode of the CU-CP or CU-UP indicating whether the CU-CP or CU-UP is in a closed mode, hybrid mode, or open mode.

Figure 13:
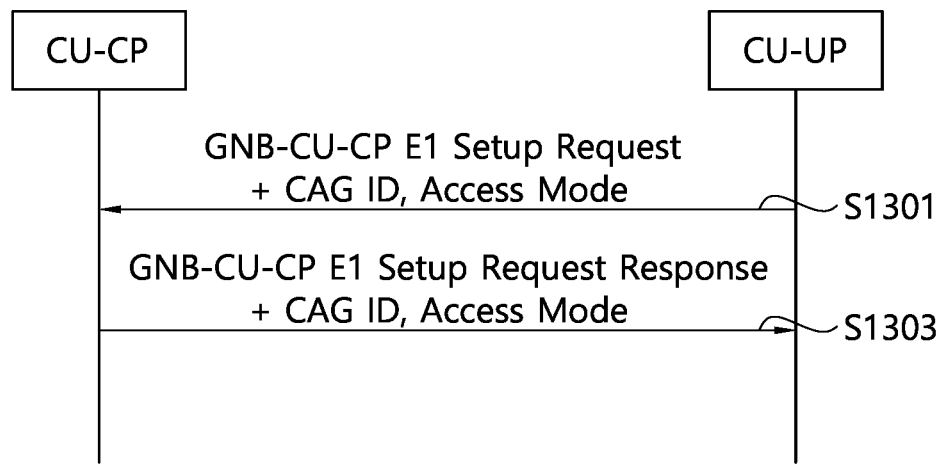
FIG. 13 shows an example of a procedure for E1 interface setup initiated by CU-UP according to an embodiment of the present disclosure.

FIG. 13 shows an example of a procedure for E1 interface setup initiated by CU-UP according to an embodiment of the present disclosure. The procedure may be a cell specific procedure between CU-CP and CU-UP for setting up application level configuration data needed to inter-operate correctly over an E1 interface.

Referring to FIG. 13, in step S1301, the CU-UP may transmit, to the CU-CP, a E1 setup request message (e.g., gNB-CU-UP E1 setup request message), which may be a message for requesting a setup of an E1 interface between the CU-CP and the CU-UP. The E1 setup request message may comprise at least one of: a CAG ID or similar ID about supporting CAG concept (e.g., a list of CAG IDs or IDs each of which indicates a CAG in a PLMN to which the CU-UP belongs); indication of supporting CAG concept (e.g., indication of CAGs in a PLMN to which the CU-UP belongs); or access mode of the CU-UP indicating whether the CU-UP is in a closed mode, hybrid mode, or open mode.

In step S1303, the CU-CP may transmit, to the CU-UP, an E1 setup response message (e.g., gNB-CU-UP E1 setup response message), which may be a response message for the E1 setup request message. The E1 setup response message may comprise at least one of: a CAG ID or similar ID about supporting CAG concept (e.g., a list of CAG IDs or IDs each of which indicates a CAG in a PLMN to which the CU-CP belongs); indication of supporting CAG concept (e.g., indication of CAGs in a PLMN to which the CU-CP belongs); or access mode of the CU-CP indicating whether the CU-CP is in a closed mode, hybrid mode, or open mode.

After the step S1303, the CU-CP and/or CU-UP can take proper action(s) based on the received parameters in the E1 setup request message or the E1 setup response message. For example, the CU-CP and/or CU-UP can control to perform a communication between the CU-CP/CU-UP and the UE based on a match between the received CAG ID(s) and CAG ID(s) of the UE during, for example, MM attach procedure, service request procedure, TAU procedure, handover mobility procedure, DU change procedure, and/or DC procedure. For another example, the CU-CP and/or CU-UP can select proper DU, cell and/or CU-UP for the UE based on a match between the received CAG ID(s) and CAG ID(s) of the UE during, for example, MM attach procedure, service request procedure, TAU procedure, handover mobility procedure, DU change procedure, and/or DC procedure.

According to various embodiments, the CU-CP or CU-UP triggered configuration update procedures can transmit a message (e.g., gNB-CU-CP Configuration Update message or gNB-CU-UP Configuration Update message) comprising information to update the status of cells if the CU-CP or CU-UP has changed the information. The information may comprise at least one of: a CAG ID or similar ID about supporting CAG concept (e.g., a list of CAG IDs or IDs each of which indicates a CAG in a PLMN to which the CU-CP or CU-UP belongs); indication of supporting CAG concept (e.g., indication of CAGs in a PLMN to which the CU-CP or CU-UP belongs); or access mode of the CU-CP or CU-UP indicating whether the CU-CP or CU-UP is in a closed mode, hybrid mode, or open mode.

Figure 14:
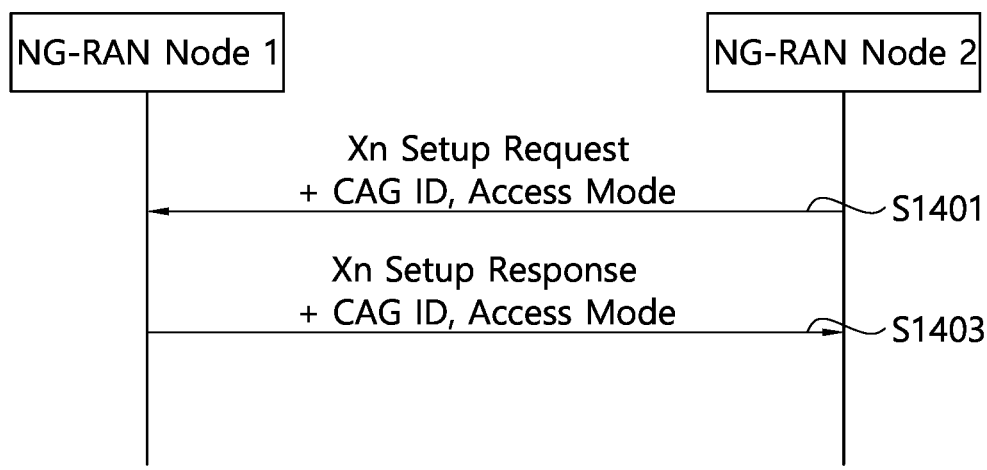
FIG. 14 shows an example of a procedure for Xn interface setup according to an embodiment of the present disclosure.

FIG. 14 shows an example of a procedure for Xn interface setup according to an embodiment of the present disclosure. The procedure may be a cell specific procedure between NG-RAN node 1 and NG-RAN node 2 for setting up application level configuration data needed to inter-operate correctly over an Xn interface. Although NG-RAN node 1 and NG-RAN node 2 are illustrated in FIG. 14, the NG-RAN node 1 and NG-RAN node 2 can be substituted for any RAN node in a wireless communication system.

Referring to FIG. 14, in step S1401, the NG-RAN node 1 may transmit, to the NG-RAN node 2, an Xn setup request message, which may be a message for requesting a setup of an Xn interface between the NG-RAN node 1 and the NG-RAN node 2. The Xn setup request message may comprise at least one of: a CAG ID or similar ID about supporting CAG concept (e.g., a list of CAG IDs or IDs each of which indicates a CAG in a PLMN to which the NG-RAN node 1 and/or neighbor RAN node of the NG-RAN node 1 belongs); indication of supporting CAG concept (e.g., indication of CAGs in a PLMN to which the NG-RAN node 1 and/or neighbor RAN node of the NG-RAN node 1 belongs); or access mode of the NG-RAN node 1 indicating whether the NG-RAN node 1 is in a closed mode, hybrid mode, or open mode.

In step S1403, the NG-RAN node 2 may transmit, to the NG-RAN node 1, an Xn setup response message, which may be a response message for the Xn setup request message. The Xn setup response message may comprise at least one of: a CAG ID or similar ID about supporting CAG concept (e.g., a list of CAG IDs or IDs each of which indicates a CAG in a PLMN to which the NG-RAN node 2 and/or neighbor RAN node of the NG-RAN node 2 belongs); indication of supporting CAG concept (e.g., indication of CAGs in a PLMN to which the NG-RAN node 2 and/or neighbor RAN node of the NG-RAN node 2 belongs); or access mode of the NG-RAN node 2 indicating whether the NG-RAN node 2 is in a closed mode, hybrid mode, or open mode.

After the step S1403, the NG-RAN node 1 and/or NG-RAN node 2 can take proper action(s) based on the received parameters in the Xn setup request message or the Xn setup response message. For example, the NG-RAN node 1 and/or NG-RAN node 2 can control to perform a communication between the NG-RAN node 1/NG-RAN node 2 and the UE based on a match between the received CAG ID(s) and CAG ID(s) of the UE during, for example, handover mobility procedure, DU change procedure, DC procedure, registration procedure, service request procedure, TAU procedure, and/or routing area update (RAU) procedure. For another example, the NG-RAN node 1 and/or NG-RAN node 2 can select proper target node for the UE based on a match between the received CAG ID(s) and CAG ID(s) of the UE during, for example, handover mobility procedure, DU change procedure, DC procedure, registration procedure, service request procedure, TAU procedure, and/or RAU procedure. The target node may comprise a RAN node from which the CAG ID(s) is received, or a neighbor RAN node of the RAN node.

According to various embodiments, the NG-RAN node 1 or NG-RAN node 2 triggered configuration update procedures can transmit a message (e.g., NG-RAN node Configuration Update message or NG-RAN node Configuration Update Acknowledge message) comprising information to update the status of cells if the NG-RAN node 1 or NG-RAN node 2 has changed the information. The information may comprise at least one of: a CAG ID or similar ID about supporting CAG concept (e.g., a list of CAG IDs or IDs each of which indicates a CAG in a PLMN to which the NG-RAN node 1, NG-RAN node 2 or their neighbor RAN node belongs); indication of supporting CAG concept (e.g., indication of CAGs in a PLMN to which the NG-RAN node 1, NG-RAN node 2 or their neighbor RAN node belongs); or access mode of the NG-RAN node 1 or NG-RAN node 2 indicating whether the NG-RAN node 1 or NG-RAN node 2 is in a closed mode, hybrid mode, or open mode.

Figure 15:
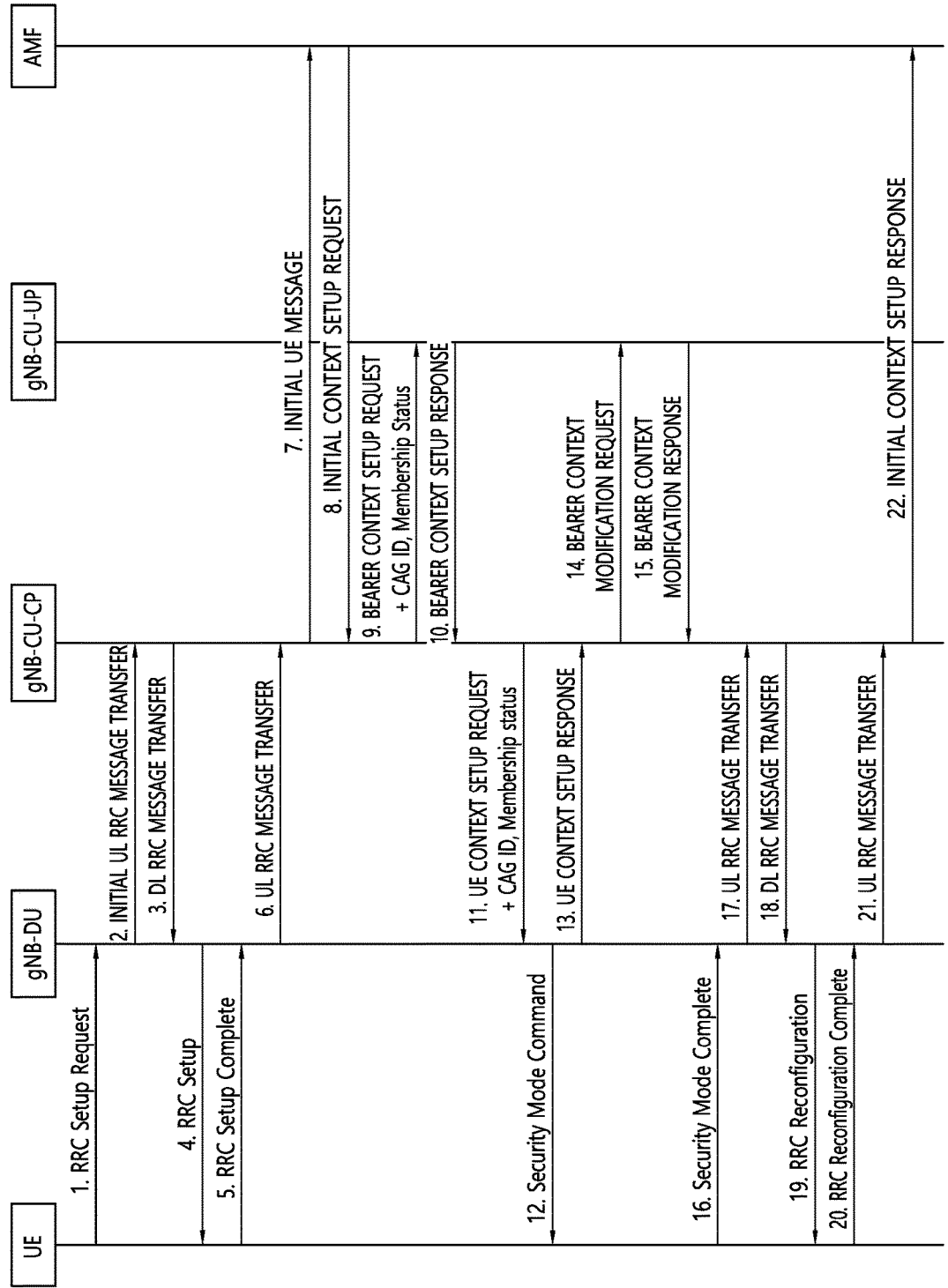
FIG. 15 shows an example of a procedure for an initial access according to an embodiment of the present disclosure.

FIG. 15 shows an example of a procedure for an initial access according to an embodiment of the present disclosure. The procedure may be a UE specific procedure for a UE initial access involving F1 interface and E1 interface (i.e., the base station is functionally split to CU and DU(s), and CU is functionally split to CU-CP and CU-UP(s)). In FIG. 15, steps 1-8 and 16-22 may refer to corresponding steps in clause 8.1 and/or 8.6 of 3GPP TS 38.401 V15.4.0 (2018 December).

In step 1, the UE may send an RRCSetupRequest message to the gNB-DU.

In step 2, the gNB-DU may transfer, to the gNB-CU-CP, the INITIAL UL RRC MESSAGE TRANSFER message comprising the RRC message (e.g., the RRCSetupRequest message) and, if the UE is admitted, the corresponding low layer configuration for the UE. The INITIAL UL RRC MESSAGE TRANSFER message may comprise cell-radio network temporary identity (C-RNTI) allocated by the gNB-DU.

In step 3, the gNB-CU-CP may transfer, to the gNB-DU, the DL RRC MESSAGE TRANSFER message. The gNB-CU-CP may allocate a gNB-CU UE F1AP ID for the UE and generates an RRCSetup message towards the UE. The RRC message (e.g., RRCSetup message) may be encapsulated in the DL RRC MESSAGE TRANSFER message.

In step 4, the gNB-DU may send the RRCSetup message to the UE.

In step 5, the UE may send the RRCSetupComplete message to the gNB-DU.

In step 6, the gNB-DU may send, to the gNB-CU-CP, the UL RRC MESSAGE TRANSFER message. The gNB-DU may encapsulate the RRC message (e.g., RRCSetupComplete message) in the UL RRC MESSAGE TRANSFER message.

In step 7, the gNB-CU-CP may send the INITIAL UE MESSAGE message to the AMF entity.

In step 8, the AMF entity may send the INITIAL CONTEXT SETUP REQUEST message to the gNB-CU-CP. According to various embodiments, the INITIAL CONTEXT SETUP REQUEST message may comprise a list of CAG IDs supported by the UE.

In step 9, the gNB-CU-CP may send, to the gNB-CU-UP, the BEARER CONTEXT SETUP REQUEST message to establish the bearer context in the gNB-CU-UP. The BEARER CONTEXT SETUP REQUEST message may comprise at least one of: CAG ID(s) or ID(s) about supporting CAG for the UE (e.g., a list of CAG ID(s) or ID(s) each of which indicates a CAG in a PLMN which allows access to the UE); indication of the UE supporting CAG (e.g., indication of CAG(s) in a PLMN which allows access to the UE); or a membership status of the UE on whether the UE is a member or not (e.g., membership status of the UE for CAG(s) identified by CAG ID(s) of the gNB-CU-CP).

In step 10, the gNB-CU-UP may use information received from the gNB-CU-CP (e.g., parameters in the BEARER CONTEXT SETUP REQUEST message received from the gNB-CU-CP), and take proper action(s).

For example, if the gNB-CU-UP is in a closed mode, the gNB-CU-UP may determine whether to allocate UP resources to the UE or not. If at least one CAG ID of the gNB-CU-UP matches at least one CAG ID of the UE, the UE is allowed to access to CAG(s) identified by matching CAG ID(s) of the gNB-CU-UP, and the gNB-CU-UP determines to allocate the UP resources to the UE. Otherwise, the UE is not allowed to access to CAG(s) identified by CAG ID(s) of the gNB-CU-UP, and the gNB-CU-UP determines not to allocate the UP resource to the UE.

For another example, if the gNB-CU-UP is in a hybrid mode, the gNB-CU-UP may determine whether the UE is a member of CAG(s) identified by CAG ID(s) of the gNB-CU-UP. If the UE is a member, the UE is allowed to access to CAG(s) identified by CAG ID(s) of the gNB-CU-UP, and the resource utilization for the UE can be prioritized (i.e., the gNB-CU-UP may preferentially allocate UP resources to the UE than other UEs which are not member). On the other hand, if the UE is not a member, the UE is also allowed to access to CAG(s) identified by CAG ID(s) of the gNB-CU-UP (i.e., the UE still can use the resources allocated by the gNB-CU-UP), but the resource utilization may not be prioritized for the UE (i.e., the gNB-CU-UP may preferentially allocate UP resources to other UEs which are member than the UE).

If the UE is allowed to access to CAG(s) identified by CAG ID(s) of the gNB-CU-UP, the gNB-CU-UP then may send, to the gNB-CU-CP, the BEARER CONTEXT SETUP RESPONSE message comprising F1-U UL TEID and transport layer address allocated by the gNB-CU-UP.

In step 11, the gNB-CU-CP may allocate gNB-CU UE F1 AP ID and send, to the gNB-DU, UE CONTEXT SETUP REQUEST message comprising SRB ID(s) and DRB ID(s) to be setup, CellGroupConfig stored in gNB-CU or retrieved from an old NG-RAN node. The UE CONTEXT SETUP REQUEST message may comprise at least one of: CAG ID(s) or ID(s) about supporting CAG for the UE (e.g., a list of CAG ID(s) or ID(s) each of which indicates a CAG in a PLMN which allows access to the UE); indication of the UE supporting CAG (e.g., indication of CAG(s) in a PLMN which allows access to the UE); or a membership status of the UE on whether the UE is a member or not (e.g., membership status of the UE for CAG(s) identified by CAG ID(s) of the gNB-CU-CP).

In step 12, the gNB-DU may send, to the UE, a SecurityModeCommand message.

In step 13, the gNB-DU may use information received from the gNB-CU (e.g., parameters in the UE CONTEXT SETUP REQUEST message received from the gNB-CU-CP), and take proper action(s).

For example, if the gNB-DU is in a closed mode, the gNB-DU may determine whether to allocate UP resources to the UE or not. If at least one CAG ID of the gNB-DU matches at least one CAG ID of the UE, the UE is allowed to access to CAG(s) identified by matching CAG ID(s) of the gNB-DU, and the gNB-DU determines to allocate the UP resources to the UE. Otherwise, the UE is not allowed to access to CAG(s) identified by CAG ID(s) of the gNB-DU, and the gNB-DU determines not to allocate the UP resources to the UE.

For another example, if the gNB-DU is in a hybrid mode, the gNB-DU may determine whether the UE is a member of CAG(s) identified by CAG ID(s) of the gNB-DU. IF the UE is a member, the UE is allowed to access to CAG(s) identified by CAG ID(s) of the gNB-DU, and the resource utilization for the UE can be prioritized (i.e., the gNB-DU may preferentially allocate UP resources to the UE than other UEs which are not member). On the other hand, if the UE is not a member, the UE is also allowed to access to CAG(s) identified by CAG ID(s) of the gNB-DU (i.e., the UE still can use the resources allocated by the gNB-DU), but the resource utilization may not be prioritized for the UE (i.e., the gNB-DU may preferentially allocate UP resources to other UEs which are member than the UE).

If the UE is allowed to access to CAG(s) identified by CAG ID(s) of the gNB-DU, the gNB-DU may send, to the gNB-CU-CP, a UE CONTEXT SETUP RESPONSE message comprising RLC/MAC/PHY configuration of SRB and DRBs provided by the gNB-DU.

In step 14, the gNB-CU-CP may send, to the gNB-CU-UP, the BEARER CONTEXT MODIFICATION REQUEST message comprising F1-U DL TEID and transport layer address allocated by the gNB-DU.

In step 15, the gNB-CU-Up may send, to the gNB-CU-CP, the BEARER CONTEXT MODIFICATION RESPONSE message.

In step 16, the UE may send SecurityModeComplete message to the gNB-DU.

In step 17, the gNB-DU may send, to the gNB-CU-CP, the UL RRC MESSAGE TRANSFER message encapsulating the RRC message (e.g., SecurityModeComplete message).

In step 18, the gNB-CU-CP may generate the RRCReconfiguration message, and transmit, to the gNB-DU, the DL RRC MESSAGE TRANSFER message encapsulating the RRCReconfiguration message.

In step 19, the gNB-DU may send RRCReconfiguration message to the UE.

In step 20, the UE may send RRCReconfigurationComplete message to the gNB-DU.

In step 21, the gNB-DU may send, to the gNB-CU-CP, the UL RRC MESSAGE TRANSFER message encapsulating the RRC message (e.g., RRCReconfigurationComplete message).

In step 22, the gNB-CU-CP may send the INITIAL CONTEXT SETUP RESPONSE message to the AMF entity.

According to various embodiments, steps 14-15 and 16-17 can happen in parallel, but both can happen before step 18.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 16:
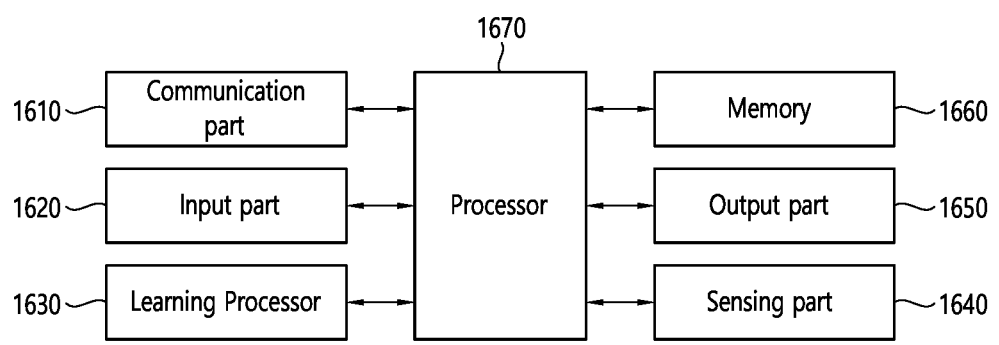
FIG. 16 shows an example of an AI device to which the technical features of the present disclosure can be applied.

FIG. 16 shows an example of an AI device to which the technical features of the present disclosure can be applied.

The AI device 1600 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 16, the AI device 1600 may include a communication part 1610, an input part 1620, a learning processor 1630, a sensing part 1640, an output part 1650, a memory 1660, and a processor 1670.

The communication part 1610 can transmit and/or receive data to and/or from external devices such as the AI devices and the AI server using wire and/or wireless communication technology. For example, the communication part 1610 can transmit and/or receive sensor information, a user input, a learning model, and a control signal with external devices. The communication technology used by the communication part 1610 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1620 can acquire various kinds of data. The input part 1620 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1620 can acquire input data to be used when acquiring an output using learning data and a learning model for model learning. The input part 1620 may obtain raw input data, in which case the processor 1670 or the learning processor 1630 may extract input features by preprocessing the input data.

The learning processor 1630 may learn a model composed of an ANN using learning data. The learned ANN can be referred to as a learning model. The learning model can be used to infer result values for new input data rather than learning data, and the inferred values can be used as a basis for determining which actions to perform. The learning processor 1630 may perform AI processing together with the learning processor of the AI server. The learning processor 1630 may include a memory integrated and/or implemented in the AI device 1600. Alternatively, the learning processor 1630 may be implemented using the memory 1660, an external memory directly coupled to the AI device 1600, and/or a memory maintained in an external device.

The sensing part 1640 may acquire at least one of internal information of the AI device 1600, environment information of the AI device 1600, and/or the user information using various sensors. The sensors included in the sensing part 1640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1650 may generate an output related to visual, auditory, tactile, etc. The output part 1650 may include a display unit for outputting visual information, a speaker for outputting auditory information, and/or a haptic module for outputting tactile information.

The memory 1660 may store data that supports various functions of the AI device 1600. For example, the memory 1660 may store input data acquired by the input part 1620, learning data, a learning model, a learning history, etc.

The processor 1670 may determine at least one executable operation of the AI device 1600 based on information determined and/or generated using a data analysis algorithm and/or a machine learning algorithm. The processor 1670 may then control the components of the AI device 1600 to perform the determined operation. The processor 1670 may request, retrieve, receive, and/or utilize data in the learning processor 1630 and/or the memory 1660, and may control the components of the AI device 1600 to execute the predicted operation and/or the operation determined to be desirable among the at least one executable operation. The processor 1670 may generate a control signal for controlling the external device, and may transmit the generated control signal to the external device, when the external device needs to be linked to perform the determined operation. The processor 1670 may obtain the intention information for the user input and determine the user's requirements based on the obtained intention information. The processor 1670 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1630 and/or learned by the learning processor of the AI server, and/or learned by their distributed processing. The processor 1670 may collect history information including the operation contents of the AI device 1600 and/or the user's feedback on the operation, etc. The processor 1670 may store the collected history information in the memory 1660 and/or the learning processor 1630, and/or transmit to an external device such as the AI server. The collected history information can be used to update the learning model. The processor 1670 may control at least some of the components of AI device 1600 to drive an application program stored in memory 1660. Furthermore, the processor 1670 may operate two or more of the components included in the AI device 1600 in combination with each other for driving the application program.

Figure 17:
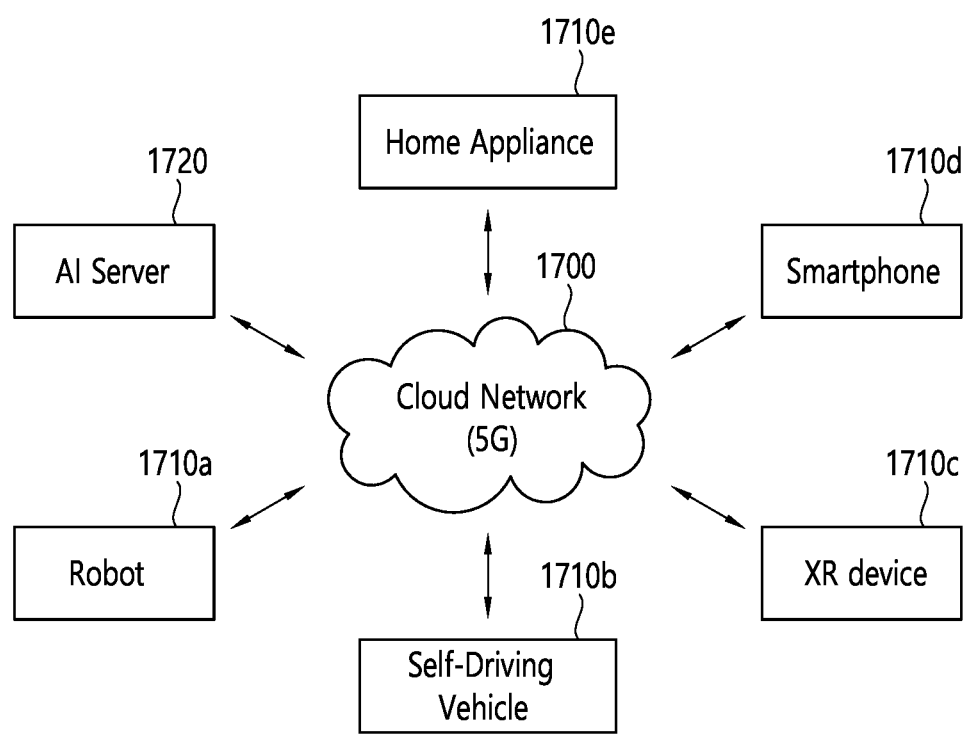
FIG. 17 shows an example of an AI system to which the technical features of the present disclosure can be applied.

FIG. 17 shows an example of an AI system to which the technical features of the present disclosure can be applied.

Referring to FIG. 17, in the AI system, at least one of an AI server 1720, a robot 1710a, an autonomous vehicle 1710b, an XR device 1710c, a smartphone 1710d and/or a home appliance 1710e is connected to a cloud network 1700. The robot 1710a, the autonomous vehicle 1710b, the XR device 1710c, the smartphone 1710d, and/or the home appliance 1710e to which the AI technology is applied may be referred to as AI devices 1710a to 1710e.

The cloud network 1700 may refer to a network that forms part of a cloud computing infrastructure and/or resides in a cloud computing infrastructure. The cloud network 1700 may be configured using a 3G network, a 4G or LTE network, and/or a 5G network. That is, each of the devices 1710a to 1710e and 1720 consisting the AI system may be connected to each other through the cloud network 1700. In particular, each of the devices 1710a to 1710e and 1720 may communicate with each other through a base station, but may directly communicate with each other without using a base station.

The AI server 1720 may include a server for performing AI processing and a server for performing operations on big data. The AI server 1720 is connected to at least one or more of AI devices constituting the AI system, i.e. the robot 1710a, the autonomous vehicle 1710b, the XR device 1710c, the smartphone 1710d and/or the home appliance 1710e through the cloud network 1700, and may assist at least some AI processing of the connected AI devices 1710a to 1710e. The AI server 1720 can learn the ANN according to the machine learning algorithm on behalf of the AI devices 1710a to 1710e, and can directly store the learning models and/or transmit them to the AI devices 1710a to 1710e. The AI server 1720 may receive the input data from the AI devices 1710a to 1710e, infer the result value with respect to the received input data using the learning model, generate a response and/or a control command based on the inferred result value, and transmit the generated data to the AI devices 1710a to 1710e. Alternatively, the AI devices 1710a to 1710e may directly infer a result value for the input data using a learning model, and generate a response and/or a control command based on the inferred result value.

Various embodiments of the AI devices 1710a to 1710e to which the technical features of the present disclosure can be applied will be described. The AI devices 1710a to 1710e shown in FIG. 17 can be seen as specific embodiments of the AI device 1600 shown in FIG. 16.

The present disclosure can have various advantageous effects.

For example, by performing an access control, mobility management and/or resource allocation based on closed access group (CAG) identities (IDs), advanced services can be realized in a wireless communication system (e.g., 5G NR), and/or in CU/DU based architecture.

For advanced services like industry digitalization and smart factories, the service can be closed in factory. Or operators can provide a specific service layer for high-value customers to give them the higher-quality differentiated services. Or the service can be for the indoor hotspot deployment scenario, which focuses on small coverage and high user throughput or user density in buildings. Various embodiments provide solutions to make the services be realistic in case of CU/DU split based NG-RAN architecture.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a central unit (CU) of a base station in a wireless communication system, the method comprising:

receiving, from a distributed unit (DU) of the base station, an F1 setup request message comprising a list of closed access group (CAG) identifiers (IDs) supported by the DU; and transmitting, to the DU, an F1 setup response message as a response for the F1 setup request message, wherein the F1 setup response message comprises a list of IDs related to non-public network (NPN) supported by the CU, wherein the list of CAG IDs and the list of IDs related to NPN are used to select one or more cells to serve a user equipment (UE).

2. The method of claim 1, wherein the F1 setup request message is a message for requesting a setup of an F1 interface between the CU and the DU.

3. The method of claim 1, wherein the F1 setup request message and the F1 setup response message are exchanged between the CU and the DU in a procedure of setting up an application level configuration data to inter-operate over the F1 interface.

4. The method of claim 1, further comprising:
obtaining a list of CAG IDs supported by the UE from a core network entity.

5. The method of claim 4, wherein the obtaining of the list of CAG IDs supported by the UE comprises receiving, from an access and mobility management function (AMF) entity, an initial context setup request message comprising the list of CAG IDs supported by the UE.

6. The method of claim 1, wherein the receiving of the list of CAG IDs supported by the DU comprises receiving, from a plurality of DUs of the base station, a list of CAG IDs supported by each of the plurality of DUs, further comprising:
identifying at least one CAG ID in the list of CAG IDs supported by each of the plurality of DUs that matches the at least one CAG ID in a list of CAG IDs supported by the UE;
selecting one or more DUs among the plurality of DUs which support the at least one identified CAG ID; and
selecting the DU to communicate with the UE among the one or more DUs.

7. The method of claim 1, further comprising controlling a communication between the DU and the UE during at least one of mobility management (MM) attach procedure, service request procedure, tracking area update (TAU) procedure, handover mobility procedure, DU change procedure, or dual connectivity (DC) procedure.

8. The method of claim 1, wherein the CU comprises CU-control plane (CU-CP), further comprising:
receiving, from one or more CU-user planes (CU-UPs), a list of CAG IDs supported by each of the one or more CU-UPs; and
selecting at least one of the DU or a CU-UP among the one or more CU-UPs based on the list of CAG IDs supported by each of the one or more CU-UPs.

9. The method of claim 8, wherein the list of CAG IDs supported by each of the one or more CU-UPs is received by the CU-CP from the one or more CU-UPs in a procedure of setting up an E1 interface between the CU-CP and each of the one or more CU-UPs.

10. The method of claim 1, wherein the CU comprises CU-user plane (UP), further comprising:
receiving, from a CU-control plane (CP), a bearer context setup request message comprising a list of CAG IDs supported by the UE; and
allocating UP resources to the UE based on a match between at least one CAG ID in the list of CAG IDs supported by the UE and at least one CAG ID in a list of CAG IDs supported by the CU-UP.

11. The method of claim 1, further comprising:
triggering a configuration update procedure based on that the list of IDs related to NPN is updated; and transmitting, to the DU, information for the updated list of IDs related to NPN in the configuration update procedure.

12. A method performed by a distributed unit (DU) of a base station in a wireless communication system, the method comprising:
initiating an F1 setup procedure;
transmitting, to a central unit (CU) of the base station, F1 setup request message comprising a list of closed access group (CAG) identifiers (IDs) supported by the DU; and
receiving, from the CU, F1 setup response message as a response for the F1 setup request message,
wherein the F1 setup response message comprises a list of IDs related to non-public network (NPN) supported by the CU, and
wherein the list of CAG IDs and the list of IDs related to NPN are used to select one or more cells to serve a user equipment (UE).

13. The method of claim 12, wherein a list of CAG IDs supported by the UE is received via a UE context setup request message, and
wherein the UE context setup request message is a message informing at least one of signalling radio bearer (SRB) IDs or data radio bearer (DRB) IDs to be setup.

14. The method of claim 13, further comprising:
transmitting, to the CU, a UE context setup response message comprising a configuration of SRBs for the SRB IDs or DRBs for the DRB IDs provided by the DU, based on the match between at least one CAG ID in the list of CAG IDs supported by the UE and at least one CAG ID in the list of CAG IDs supported by the DU.

15. The method of claim 12, further comprising:
wherein the F1 setup request message is a message for requesting a setup of an F1 interface between the CU and the DU, and
wherein the F1 setup response message is a response message for the F1 setup request message.

16. The method of claim 12, further comprising:
triggering a configuration update procedure; and
based on that the list of IDs related to NPN is updated, receiving, from the CU, information for the updated list of IDs related to NPN in the configuration update procedure.

17. A method performed by a user equipment (UE) in a wireless communication system, the method comprising:
transmitting, to a distributed unit (DU) of a base station, a radio resource control (RRC) setup request message;
receiving, from the UE, an RRC setup message generated by a central unit (CU) of the base station; and
transmitting, to the DU, an RRC setup complete message,
wherein the UE is served by one or more cells selected based on a list of a list of closed access group (CAG) identifiers (IDs) supported by the DU and a list of IDs related to non-public network (NPN) supported by the CU,
wherein the list of CAG IDs is transmitted from the DU to the CU via an F1 setup request message, and
wherein the list of IDs related to NPN is transmitted from the CU to the DU via an F1 setup response message as a response for the F1 setup request message.

* * * * *